INVENTOR:
EDMOND L. SMITH

United States Patent Office  3,212,856
Patented Oct. 19, 1965

3,212,856
APPARATUS FOR COLLECTING FUME FROM RECOVERY UNIT GASES
Edmond L. Smith, Simsbury, Conn., assignor to Combustion Engineering, Inc., a corporation of Delaware
Filed Dec. 2, 1960, Ser. No. 73,304
1 Claim. (Cl. 23—262)

This invention relates to the recovery of chemicals from the gases which leave the chemical recovery units such as are used in paper pulp mills that employ a sodium base process of pulp digestion.

In the sodium base process of paper pulp manufacture, wood chips are cooked in digesters, and the resulting pulp is taken from the digesters, washed, and prepared for further use. The so-called "black" liquor separated from the removed pulp is thereafter passed through multiple effect evaporators for greater concentration and then is burned in a special furnace to oxidize the organic matter, and to recover the inorganic chemicals.

A portion of the chemicals thus separated by the burning of the black liquor is carried in suspension by the gases from the furnace and through an associaated boiler that converts the heat in the furnace gases into useful steam. Upon leaving the boiler the gases generally pass through a direct contact evaporator, and then through other filtering apparatus for the purpose of removing the valuable chemicals from the gases before they are exhausted to the atmosphere through a suitable stack. The patent to Hochmuth, 2,516,992, issued August 1, 1950, shows one type of apparatus used downstream of the evaporator for the purpose of recovering the chemicals from the gases. Another previous method used for recovering the chemicals from the gases was by the use of an electrostatic precipitator in the breeching downstream of the evaporator. This type of installation, while affording highest efficiency and greatest economy of operation often required more space than available.

It is an object of this invention to provide novel means and a method of operation thereof for recovering the chemicals from gases in a more economical and space-saving manner than that presently used. This is accomplished by providing the ductwork for the passage of gases leaving the boiler flowing towards the direct contact evaporator with a low draft-loss, electrostatic agglomerator, whereby the chemicals entrained in the gases in the form of fine dust particles are agglomerated to a much larger size, and the direct contact evaporator is then utilized to separate these larger particles from the gases as they flow through it. About 50 percent of the dust particles entrained in the gases leaving the boiler are less than a micron in size, and are too fine to be separated out by the evaporator. In accordance with this invention, the use of an agglomerator upstream of the direct contact evaporator, which agglomerator can be installed in the ductwork necessary for conveying the gases from the boiler to the evaporator even in present recovery units, increases essentially all of the fume or particles to a size of 5–10 microns, which is large enough to be efficiently removed from the gases by the direct contact evaporators presently in use today. An important aspect of the present invention is that the agglomerator must be so designad that the flow of gases therethrough is of a high velocity, in order to present the agglomerated particles from separating out of the moving gas stream onto the agglomerator structure. By maintaining a high velocity flow of the gases through the agglomerator, very few, if any, of the agglomerated particles will settle out of the moving gas stream in the agglomerator zone.

Additional objects and advantages of the invention will appear from the following description of a preferred embodiment thereof when considered in conjunction with the accompanying drawings wherein.

Figure 1:
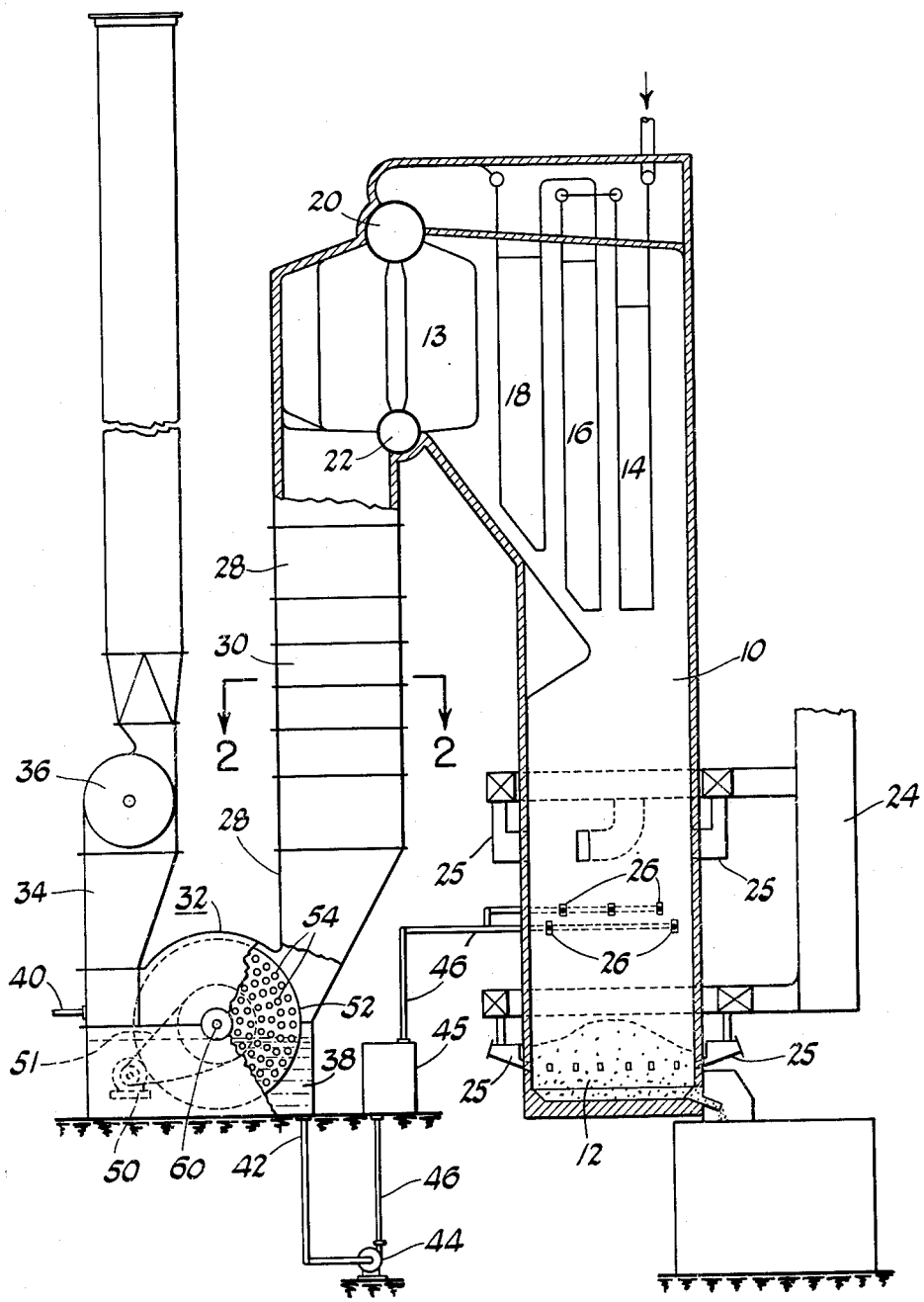
FIGURE 1 is a vertical elevation (partly in cross section) of a black liquor recovery system employing the principles of the invention.

Referring to FIGURE 1, 10 denotes a recovery furnace having a hearth, or smelting zone 12 and superimposed boiler 13. The black liquor, evaporated to the desired density and at the proper temperature, is introduced into the furnace chamber 10 by nozzles 26. The air for combustion is supplied by means of duct 24 and nozzles 25.

The steam boiler comprises upper steam and water drum 20, lower water drum 22, and banks of superheater tubes 14, 16 and 18. Gases rising from the furnace 10 flow through the superheater zone, thence through the boiler 13, pass through duct 28 containing the electrostaic agglomerator 30, and into the cascade evaporator 32 where the agglomerated fume which is removed is returned to the liquor cycle. The gases leave evaporator 32 via duct 34 and are thereby exhausted to the stack by means of induced draft fan 36.

Strong (40–50% solids) black liquor is supplied to the cascade evaporator 32 through inlet 40, and concentrated black liquor containing the collected ash is withdrawn therefrom by conduit 42, and pumped by means of pump 44 through line 46 to the furnace 10.

In operation black liquor is sprayed into furnace 10 through nozzles 26, which liquor gravitates to the smelting zone 12. During its downward flow the black liquor is dried and partly volatilized by the burning constituents of the liquor, with the greater portion of the combustion taking place in the smelting zone 12. Air for combustion is supplied to the smelting zone and into the furnace thereabove through duct 24 and nozzles 25, and the products of combustion rise upwardly through the furnace and thence through the superheater and boiler 13, throughout which the heat is utilized in generating steam.

When heat is applied to the black liquor in the furnace, sodium carbonate, sodium sulphide, and other sodium compounds are formed in the smelting zone 12. Since sodium salts will vaporize at furnace temperature they are carried in suspension by the combustion gases and these vapors will condense on the cooler surfaces of the tubes. Before entering the boiler the gases should be cooled to approximately 1200° F., below which temperature the entrained chemical particles will not adhere to the boiler tubes.

After passing through the boiler 13, the gases pass by way of duct 28 into the agglomerator 30, where the fine dust particles are agglomerated or coalesced into a fewer number of much larger particles. These larger agglomerated particles are then carried by the moving gas stream to the cascade evaporator, where they are then separated out of the gas stream and are collected on the wetted surfaces of the cascade evaporator as the gases pass through the tortuous paths formed by the tubes 54, which particles are subsequently carried to the body or pool of black liquor 38 as the drum rotates. Although other evaporators can be used, it is preferred to use a tubular cascade evaporator, such as evaporator 32 illustrated in FIGURE 1, since such an evaporator presents a great number of tortuous paths through which the gases must pass thereby enabling 90 percent or more of the dust particles to be separated from the gas. The theory behind the collection efficiency is expressed by the fact that the ash which has been subjected to the ionizing effect of the electrical field (contained in the agglomerator) has a greater affinity for the aqueous solution of liquor in the cascade evaporator. The cascade evaporator 32 consists of a pair of flat discs 52 between which is secured a plurality of circular rows or banks of tubes or rods 54. The drum composed of discs 52 and tubes 54 is continuously rotated about a central axis formed by shaft 60 by means of drive 51 and motor 50. This causes the rows of tubes 54 to pass alternately through the black liquor 38 contained in the lower half of the housing, and then through the flowing gases entering the upper half of the housing by means of duct 28. The evaporator is thus utilized in a twofold manner. First, the hot gases passing over and around the tubes 54 evaporates water from the black liquor carried on the outside of the tubes, thereby increasing its concentration, and secondly, the evaporator acts as a wet scrubber, separating the agglomerated dust particles from the gases. By incorporating an agglomerator in the duct 28 upstream of the evaporator 32, a compact and efficient means for recovering chemical from the gases is achieved, without the need for further costly and bulky separating apparatus in the system downstream of the evaporator.

Figure 3:
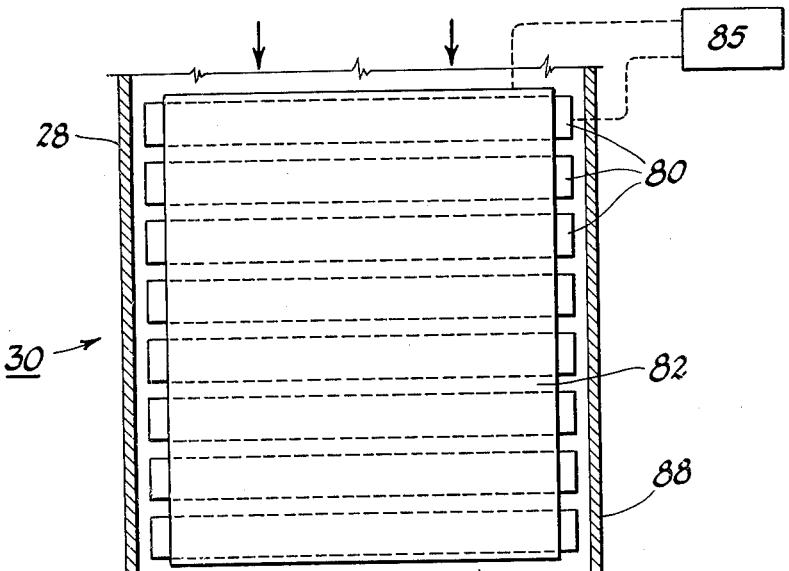
FIGURE 3 is a cross-sectional side view of the agglomerator when taken on line 3—3 of FIGURE 2.
Figure 2:
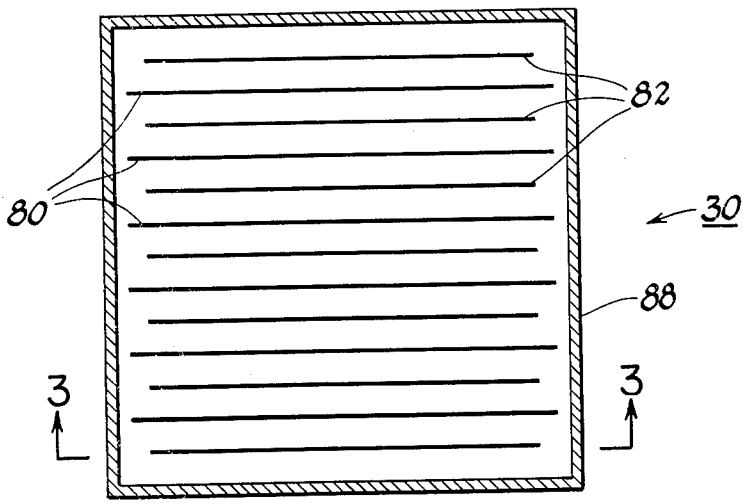
FIGURE 2 is a a top view of the agglomerator when taken on line 2—2 of FIGURE 1.

FIGURES 2 and 3 illustrate the details of the electrostatic agglomerator 30. The agglomerator consists of a plurality of charged plates or electrodes 80 and 82, between which the gases flow. These plates are operatively connected with a source of high potential direct current electrical energy 85, which is of conventional design. For example, a step up transformer in combination with an electrical rectifier would be suitable as a source. The plates 82 are connected to any suitable ground, for example through the duct walls 88. A current of such potential is delivered from the source 85, that a high difference of potential is maintained between the plates 80 and 82. This potential should be maintained at a value very close to that which will produce arcing between the electrodes; in fact, this potential should be carried at a value so close to the arcing point that occasional flash-over may occur. Through the use of the electrodes 80 and 82 an ionization zone is set up between the electrodes which will cause the fine dust particles carried by the gas stream to aggregate or coalesce into larger dust particles. It is an important aspect of this invention that the passages between the plates 80 and 82 within the agglomerator be of such a restricted area that a very high velocity flow of the gases therethrough occurs. This prevents few, if any, of the agglomerated dust particles from settling out of the gas stream in the agglomerator zone. These agglomerated dust particles are of such a size, in the order of 5–10 microns, when leaving the agglomerator, that they are readily separated out of the gases as they pass through the cascade evaporator.

Another advantage this invention has over the present chemical recovery art is that the gases that are exhausted to the atmosphere can be reduced to a lower temperature than possible if a conventional precipitator is used following a direct contact evaporator, thereby increasing overall boiler efficiency. The temperature of the gases leaving the evaporator in present units must be maintained at approximately 300° F. to prevent condensation of the gases. By placing the electrostatic equipment on the hot side of the cascade evaporator this equipment is protected against dew point condensation and the terminal gas condition leaving the direct contact evaporator can be lowered to any practical temperature, thereby utilizing much of the heat that has been previously wasted in present units in order to prevent corrosion.

While the preferred embodiment of the invention has been shown and described, it will be understood that minor changes in construction, combination and arrangement of parts may be made without departing from the spirit and scope of the invention as claimed. For example, other evaporators and agglomerators may be used in the combination in place of the specific ones shown and described.

What I claim is:

In a system for reclaiming chemical from the products of combustion of a chemical recovery unit, in combination, a furnace, an inlet to the furnace for supplying waste liquor thereto, said waste liquor being burned in the furnace thereby creating hot combustion gases, a boiler connected to the furnace through which the hot combustion gases pass after leaving the furnace, an evaporator containing a pool of waste liquor in the lower portion thereof, said evaporator also including rotating means having a plurality of closely spaced members thereon, said rotating means being positioned such that the closely spaced members alternately pass through the pool of waste liquor and the space thereabove, substantially vertical passage means joining the evaporator to the boiler, electrical agglomerating means in said passage means, located above said evaporator for agglomerating dust particles in the stream of combustion gases passing therethrough, the flow passage through the agglomerating means being of such a restricted nature that a high flow velocity is obtained therethrough, and few if any of the agglomerated particles will settle out of the combustion gases onto the agglomerating means, such agglomerated particles being separated from the combustion gases onto the closely spaced members as the gases pass through the evaporator, the combustion gases in passing through the evaporator being substantially reduced in temperature, an outlet from the evaporator through which the gases are exhausted, and a pipe extending from the evaporator to the furnace inlet.

References Cited by the Examiner

UNITED STATES PATENTS

| | | | |
|---|---|---|---|
| 1,382,037 | 6/21 | Welch | 55—121 X |
| 1,781,872 | 11/30 | Fixman | 183—7 X |
| 2,516,992 | 8/50 | Hochmuth | 23—262 |
| 2,537,558 | 1/51 | Tigges | 55—6 |
| 2,749,212 | 6/56 | Crowder | 183—7 X |

MORRIS O. WOLK, *Primary Examiner.*

MAURICE A. BRINDISI, *Examiner.*